(12) United States Patent
Suzuki

(10) Patent No.: US 8,546,043 B2
(45) Date of Patent: Oct. 1, 2013

(54) METHOD FOR PRODUCING MEMBRANE ELECTRODE ASSEMBLY, MEMBRANE ELECTRODE ASSEMBLY, APPARATUS FOR PRODUCING MEMBRANE ELECTRODE ASSEMBLY, AND FUEL CELL

(75) Inventor: Hiroshi Suzuki, Aichi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 871 days.

(21) Appl. No.: 12/596,681

(22) PCT Filed: Apr. 16, 2008

(86) PCT No.: PCT/JP2008/057792
§ 371 (c)(1), (2), (4) Date: Oct. 20, 2009

(87) PCT Pub. No.: WO2008/133255
PCT Pub. Date: Nov. 6, 2008

(65) Prior Publication Data
US 2010/0129730 A1    May 27, 2010

(30) Foreign Application Priority Data
Apr. 23, 2007  (JP) .................................. 2007-113408

(51) Int. Cl.
*H01M 8/10* (2006.01)
(52) U.S. Cl.
USPC ........................... 429/483; 429/492; 429/482
(58) Field of Classification Search
USPC ......................... 429/483, 492, 482
See application file for complete search history.

(56) References Cited

FOREIGN PATENT DOCUMENTS

| EP | 0 788 173 A1 | 8/1997 |
|----|---|---|
| EP | 1 840 992 A1 | 10/2007 |
| JP | 8-148176 | 6/1996 |
| JP | 2004-39474 | 2/2004 |
| JP | 2004-165096 | 6/2004 |
| JP | 2005-93233 | 4/2005 |
| JP | 2005-174565 | 6/2005 |
| JP | 2006-66161 | 3/2006 |
| JP | 2006-202730 | 8/2006 |
| JP | 2006-331720 | 12/2006 |
| JP | 2006-338938 | 12/2006 |
| JP | 2007-35615 | 2/2007 |
| JP | 2007-53034 | 3/2007 |
| JP | 2007-95433 | 4/2007 |
| WO | WO 2006/137346 A1 | 12/2006 |

OTHER PUBLICATIONS

Extended European Search Report for EP Appl. No. 08740782.1 dated Oct. 28, 2010.

*Primary Examiner* — Jane Rhee
(74) *Attorney, Agent, or Firm* — Finnegan, Henderson, Farabow, Garrett & Dunner, LLP

(57) ABSTRACT

This invention provides a method for producing a membrane electrode assembly comprising steps of: preparing a precursor of a membrane electrode assembly wherein a catalyst mixture comprising an electrolyte resin and a catalyst-carrying conductor is applied or placed on an electrolyte membrane; and externally exposing the precursor of the membrane electrode assembly to a superheated medium under oxygen-free or low-oxygen conditions and heating the boundary of the electrolyte membrane and the catalyst mixture in the precursor of the membrane electrode assembly by condensation heat of the superheated medium to fix the catalyst mixture to the electrolyte membrane. This method enables the production of a membrane electrode assembly that is substantially free of boundary and that has a catalyst layer in which a porous and sufficient three-phase boundary is present.

10 Claims, 13 Drawing Sheets

US 8,546,043 B2

METHOD FOR PRODUCING MEMBRANE ELECTRODE ASSEMBLY, MEMBRANE ELECTRODE ASSEMBLY, APPARATUS FOR PRODUCING MEMBRANE ELECTRODE ASSEMBLY, AND FUEL CELL

CROSS-REFERENCE TO RELATED APPLICATIONS

This application is a national phase application of International Application No. PCT/JP2008/057792, filed Apr. 16, 2008, and claims the priority of Japanese Application No. 2007-113408, filed Apr. 23, 2007, the contents of both of which are incorporated herein by reference.

TECHNICAL FIELD

The present invention relates to a method for producing a membrane electrode assembly wherein an electrolyte membrane layer and an electrode catalyst layer are laminated without a boundary therebetween, the membrane electrode assembly, an apparatus for producing the membrane electrode assembly, and a polymer fuel cell using the same.

BACKGROUND ART

Polymer fuel cells are expected to play a key role in new energy technologies in the future. A polymer fuel cell using a polymer ion-exchange membrane as an electrolyte is capable of operation at low temperature, and it can be made smaller and lighter. Thus, application thereof for mobiles such as automobiles and portable devices for consumer use has been considered. Fuel cell vehicles carrying polymer fuel cells particularly have drawn social attention as the ultimate ecology cars.

A polymer fuel cell involves the use of a membrane electrode assembly (MEA) comprising catalysts capable of oxidizing a fuel and reducing an oxidant on both surfaces of the ion-exchange membrane and gas diffusion electrodes outsides thereof. Specifically, such structure comprises an ion-exchange membrane of a polymer electrolyte membrane that selectively transports hydrogen ions and electrode catalyst layers mainly composed of carbon powders carrying platinum metal catalysts on both sides of the ion-exchange membrane. Subsequently, a gas diffusion layer that allows a fuel gas to permeate and it conducts electrons is provided on the outer surface of the electrode catalyst layer. In general, a gas diffusion layer is made of a carbon paper or carbon cloth. An electrode catalyst layer and a gas diffusion layer are referred to as an "electrode" in combination.

In the past, for example, a transfer method for integrating a catalyst layer and an electrolyte membrane as disclosed in JP Patent Publication (kokai) No. 2000-90944 (A) has been a principle technique for forming such membrane electrode assembly. In the transfer method, a catalyst mixture in ink or paste state is applied on a substrate, on which the catalyst layer is to be formed, by a method such as sedimentation, printing and spraying and thus the uniform catalyst layer is formed, and subsequently the catalyst layer is subjected to a thermocompression bonding with the electrolyte membrane. In the method, the polymer electrolyte membrane is integrated with the catalyst layer provided on the catalyst-layer-carrying substrate via heating under pressure with the use of a hot press or a hot roller (a hot pressure roller) (hereafter, this technique is referred to as a "hot press technique").

For example, JP Patent Publication (kokai) No. 10-64574 (A) (1998) discloses techniques involving the use of a hot roller (a hot pressure roller) and a hot press, as shown in FIG. 1 and FIG. 2. FIG. 1 shows the technique involving the use of a hot roller disclosed in JP Patent Publication (kokai) No. 10-64574 (A) (1998). In the technique, firstly, a long polymer electrolyte membrane 1 is integrated with catalyst layers 2 and 3 by subjecting the polymer electrolyte membrane 1 and long films 4 and 5, which are long catalyst-layer-carrying substrates carrying the catalyst layers 2 and 3 respectively and which are placed in both sides of the polymer electrolyte membrane 1, to a thermocompression bonding with the use of a pair of hot pressure rollers 6 which sandwich them. Subsequently, the films 4 and 5 carrying the catalyst layers 2 and 3 are then peeled from the catalyst layers 2 and 3 with the use of a pair of peel rollers 7.

JP Patent Publication (kokai) No. 10-64574 (A) (1998) also discloses a technique for transferring a catalyst layer formed on a catalyst-layer-carrying substrate to a polymer electrolyte membrane using a hot press. FIG. 2 schematically shows a method for transferring a catalyst layer formed on a film to an electrolyte layer using a hot press. As shown in FIG. 2, the electrolyte membrane 10 is sandwiched by films 6 on which the catalyst layers 9 are formed, and the catalyst layers 9 are transferred from the film 6 to the electrolyte membrane 10 by applying a pressure of 5 to $20 \times 10^6$ [Pa] at 80° C. to 150° C. with the use of hot presses 11A and 11B.

In the case of a membrane electrode assembly produced by the hot press technique, however, an electrolyte membrane is not satisfactorily assembled with an electrode catalyst layer, and ion resistance at the boundary between the electrolyte membrane and the electrode catalyst layer is disadvantageously increased. Also, an increased heating temperature or pressure at the time of hot pressing for the purpose of realizing satisfactorily assembled conditions would disadvantageously damage the electrolyte membrane, which would disadvantageously lower the strength of the membrane or the capacity for ion exchange. Further, an increased pressure at the time of hot pressing for the purpose of realizing satisfactorily assembled conditions would consolidate the electrode catalyst layer (i.e., making the electrode catalyst layer nonporous), which would disadvantageously lower gas diffusion in the electrode catalyst layer.

Then, JP Patent Publication (kokai) No. 2002-93424 (A) discloses a method for producing a membrane electrode assembly comprising an assembling step wherein a proton exchange membrane and/or electrode catalyst layer, which previously have been impregnated with a solvent, are pressurized and heated without being soaked in a solvent.

DISCLOSURE OF THE INVENTION

According to conventional techniques, when a sheet coated with an electrode catalyst is adhered to an electrolyte membrane with heat pressurization, pressure is applied to a contact surface between the electrolyte membrane and the catalyst layer to transfer heat thereto and soften polymers dispersed in the electrolyte membrane or the catalyst layer. Thus, open areas for accelerating gas diffusion in the catalyst layer are reduced, which disadvantageously causes the initial properties to deteriorate. Since the electrolyte membrane is susceptible to heat, the electrolyte membrane cannot be heated at high temperatures, and adhesion between the electrolyte membrane and the catalyst layer cannot be enhanced. Thus, a catalyst is easily peeled, and gaps are formed at the boundary between the catalyst layer and the electrolyte membrane, which disadvantageously increases cell resistance and causes deterioration of performance under low humidity conditions. Since pressure is applied at the time of assembly, an electrolyte membrane is likely to be damaged. In particular, the end of the catalyst layer is likely to receive stress, and the electrolyte membrane would be damaged, which would disadvantageously result in lowered durability. Further, a membrane and a catalyst are easily misaligned, and sealing therebetween would become insufficient. Also, catalysts are positioned at sites at which gas diffusion along with gas channel patterns hardly takes place, which disadvantageously produce sites at which catalysts would not effectively works.

In the case of the membrane electrode assembly produced by the method disclosed in JP Patent Publication (kokai) No. 2002-93424 (A), for example, the membrane electrode assembly is produced by heating at approximately 100° C. or lower with pressurization, in order to suppress deterioration of the membrane. This would disadvantageously weaken the assembly comprising a membrane and an electrode and result in lower durability. Thus, fuel cell performance was significantly lowered.

The present invention is accordingly intended to provide a technique that can integrate the electrolyte membrane and the electrode catalyst without pressurization (or via application of minute pressure), when fixing the electrode catalyst to the electrolyte membrane. By integrating the electrolyte membrane and the catalyst layer without pressurization or via application of minute pressure, a membrane is integrated with an electrode substantially without a boundary, and a strong membrane electrode assembly can be produced.

The present inventor discovered that the above object can be attained with the use of a certain heating means at the time of integrating the electrolyte membrane and the catalyst layer. This has led to the completion of the present invention.

Specifically, the first aspect of the present invention relates to an invention of a method of laminating an electrolyte membrane (a proton exchange membrane) and an electrode catalyst layer to produce a membrane electrode assembly (MEA). The method comprises steps of: preparing a precursor of a membrane electrode assembly wherein a catalyst mixture comprising an electrolyte resin and a catalyst-carrying conductor is applied or placed on an electrolyte membrane; and externally exposing the precursor of the membrane electrode assembly to a superheated medium under oxygen-free or low-oxygen conditions and heating the boundary of the electrolyte membrane and the catalyst mixture in the precursor of the membrane electrode assembly by condensation heat of the superheated medium to fix the catalyst mixture to the electrolyte membrane.

Superheated mediums having condensation heat that would induce the integration of the electrolyte membrane and the catalyst layer, and having a temperature that would not damage the electrolyte membrane and the catalyst layer, may be selected. Specific examples of preferable mediums include superheated water vapor at 100° C. to 280° C. and superheated water-alcohol vapor at 30° C. to 150° C.

According to the method for producing the membrane electrode assembly of the present invention, the step of heating the boundary between the electrolyte membrane and the catalyst mixture in the precursor of the membrane electrode assembly to fix the catalyst mixture to the electrolyte membrane may be carried out without pressurization. Also, the step of heating the boundary between the electrolyte membrane and the catalyst mixture in the precursor of the membrane electrode assembly to fix the catalyst mixture to the electrolyte membrane may be carried out, by using a porous heating plate, without pressurization or with an application of a low pressure of 1 MPa or lower, which is equivalent to the weight of the plate.

According to the present invention, for example, an electrolyte membrane coated with an electrode catalyst is subjected to rapid heating with a superheated water vapor in a state of a high-temperature water vapor that is equivalent to or higher than the water-saturated conditions. In the state of high-temperature water vapor, the air may be pushed out of the area and produce oxygen-free or low-oxygen conditions at an ordinary pressure may be produced. Accordingly, deterioration of an electrode catalyst, such as Pt, can be prevented. In the state of superheated water vapor, the entire electrolyte membrane that is porously coated with an electrode catalyst is uniformly and rapidly heated by a condensation heat of the superheated water vapor. Thus, an electrode catalyst can be fixed to the electrolyte membrane while maintaining porous conditions. This can produce a uniformly porous state in the catalyst layer without pressurization (or via application of minute pressure) and the power generation capacity can be improved.

Specifically, the method for producing the membrane electrode assembly of the present invention can produce a membrane electrode assembly having a catalyst layer in which a porous and satisfactory three-phase boundary has been formed. Thus, a membrane electrode assembly with improved I-V performance can be obtained.

According to the method for producing the membrane electrode assembly of the present invention, the surface of the electrolyte membrane may be planar. Alternatively, it is effective to form concavities on the surface of an electrolyte membrane on which a catalyst mixture is applied or placed. The electrode catalyst is inserted into a concave groove provided via molding, etching, or other means on the surface of the electrolyte membrane to fill the groove. Thereafter, the membrane is heated with a condensation heat of the superheated water vapor under pressureless or low-pressure conditions to soften and melt the electrolyte membrane. The molten electrolyte resin impregnates the open areas in the catalyst and the catalyst is then integrated with the electrolyte membrane.

The size range of concave grooves is extensive, between several μm and several mm, and an electrode catalyst is accommodated in the grooves. In the state of a superheated water vapor equivalent to or higher than the water-saturated conditions, the electrolyte membrane coated with the electrode catalyst is subjected to rapid heating. In the state of high-temperature water vapor, the air, which has been initially present, may be pushed out of the area and oxygen-free or low-oxygen conditions may be produced at an ordinary pressure. Accordingly, deterioration of an electrode catalyst, such as Pt, can be prevented. In the state of superheated water vapor, the porous electrode catalyst is heated at the top surface and the groove wall of the electrolyte membrane uniformly and rapidly. Accordingly, the electrode catalyst can be fixed to the electrolyte membrane while maintaining the porous state. This can produce a uniformly porous state in the catalyst layer without pressurization (or via application of minute pressure) and the power generation capacity can be improved.

Further, when the type-F electrolyte membrane is used, in particular, electrolyte resin in the convex portions is softened and melted, and thus pulled into the catalyst via capillary actions, which results in the provision of concavities. Thus, drainage of generated water or gas diffusion can be improved.

According to the method for producing the membrane electrode assembly of the present invention, type-F perfluoropolymer electrolytes, type-F hydrocarbon polymer electrolytes, type-H perfluoropolymer electrolytes, and type-H hydrocarbon polymer electrolytes can be adequately selected as an electrolyte resin. It should be noted that such polymer electrolytes are different in terms of heat-resistant temperature. Thus, the preferable temperature to be employed differs.

When an electrolyte resin is the type-F perfluoropolymer electrolyte and/or type-F hydrocarbon polymer electrolyte, a superheated medium is preferably a superheated water vapor at 200° C. to 280° C. When an electrolyte resin is of type-F, it is preferable for a step of hydrolyzing type-F functional groups of the type-F perfluoropolymer electrolyte and/or type-F hydrocarbon polymer electrolyte to be further carried out.

When an electrolyte resin is the type-H perfluoropolymer electrolyte and/or type-H hydrocarbon polymer electrolyte, heat resistance thereof is inferior to that of the type-F electrolyte. Thus, a superheated medium is preferably a superheated water vapor at 100° C. to 150° C.

The electrolyte membrane may consist of an electrolyte membrane or it may comprise a reinforced layer of a porous substrate filled with an electrolyte. A preferable example of a porous substrate used in the present invention is polytetrafluoroethylene (PTFE). In the present invention, a porous substrate having an average pore diameter (p) between 0.1 µm to 10 µm, a membrane thickness (d) between 0.5 µm and 50 µm, and a porosity between 70% and 95% is suitable for impregnation with an electrolyte solution.

The second aspect of the present invention relates to an invention of the membrane electrode assembly produced by the above method. In the membrane electrode assembly, the interface located between the electrolyte membrane and the electrode layer has substantially no boundary, and the electrode layer in the vicinity of the interface is porous.

The third aspect of the present invention relates to an invention of an apparatus for producing a membrane electrode assembly wherein a catalyst mixture comprising electrolyte resin and a catalyst-carrying conductor is applied or placed on an electrolyte membrane and thereby the electrolyte membrane is integrated with the catalyst mixture. The apparatus comprises: a whole container that produces oxygen-free or low-oxygen conditions therein; a holding mechanism that holds an electrolyte membrane on which a catalyst mixture of the electrolyte resin and the catalyst-carrying conductor has been applied or placed; an air inlet for externally exposing the precursor of the membrane electrode assembly in the whole container to a superheated medium; and an air outlet for discharging the air that had previously been in the whole container at the initial stage and the superheated medium that was introduced from the outside.

The membrane electrode assembly can be efficiently produced with the use of the apparatus for production of the present invention.

The apparatus of the present invention may be used in a batch mode or a continuous mode. When the apparatus is used in the continuous mode, the holding mechanism that holds an electrolyte membrane on which a catalyst mixture of the electrolyte resin and the catalyst-carrying conductor has been applied or placed is preferably a roll-to-roll mechanism. In such a case, the inlets and the outlets of the roll-to-roll holding mechanism that lead into and out from the whole container can also serve as air outlets.

The number of the air inlets and that of the air outlets of the apparatus of the present invention are not limited, and such number may be 1 or higher.

When the apparatus of the present invention is operated, a superheated medium may be directly sprayed onto the electrolyte membrane on which a catalyst mixture is applied or placed. Alternatively, a superheated medium may be sprayed onto the electrolyte membrane on which a catalyst mixture is applied or placed via a porous heating plate. That is, it is also within the scope of the present invention for the apparatus to have a porous heating plate for heating the boundary between the electrolyte membrane and the catalyst mixture in the precursor of the electrode assembly to fix the catalyst mixture to the electrolyte membrane.

The fourth aspect of the present invention relates to an invention of a polymer electrolyte fuel cell comprising the above membrane electrode assembly.

According to the present invention, for example, an electrolyte membrane coated with an electrode catalyst is subjected to rapid heating with a superheated water vapor in a state of a high-temperature water vapor that is equivalent to or higher than the water-saturated conditions. In the state of high-temperature water vapor, the air may be pushed out of the area and oxygen-free or low-oxygen conditions may be produced at an ordinary pressure. Accordingly, deterioration of an electrode catalyst, such as Pt, can be prevented. In the state of superheated water vapor, the entire electrolyte membrane that is porously coated with an electrode catalyst is uniformly and rapidly heated by a condensation heat of the superheated water vapor. Thus, an electrode catalyst can be fixed to the electrolyte membrane while maintaining porous conditions. This can produce a uniformly porous state in the catalyst layer without pressurization (or via application of minute pressure) and the power generation capacity can be improved.

Specifically, the method for producing the membrane electrode assembly of the present invention can produce a membrane electrode assembly having a catalyst layer on which a porous and satisfactory three-phase boundary has been formed. Thus, a membrane electrode assembly with improved I-V performance can be obtained.

In the membrane electrode assembly (MEA) of the present invention, the electrolyte membrane layer is integrated with the electrode catalyst layer such that the assembly is substantially free of a boundary, and this can result in the enhanced strength of the assembly. Specifically, a three-phase boundary is formed in a very small area, which contributes to improvement of power generation capacity. Since no boundary is present, drainage of water generated at the electrode and durability are improved.

Consequently, the present invention can produce a fuel cell having power generation capacity that is higher than that of conventional membrane electrode assemblies.

BEST MODES FOR CARRYING OUT THE INVENTION

Hereafter, the present invention is described in detail.

Figure 1:
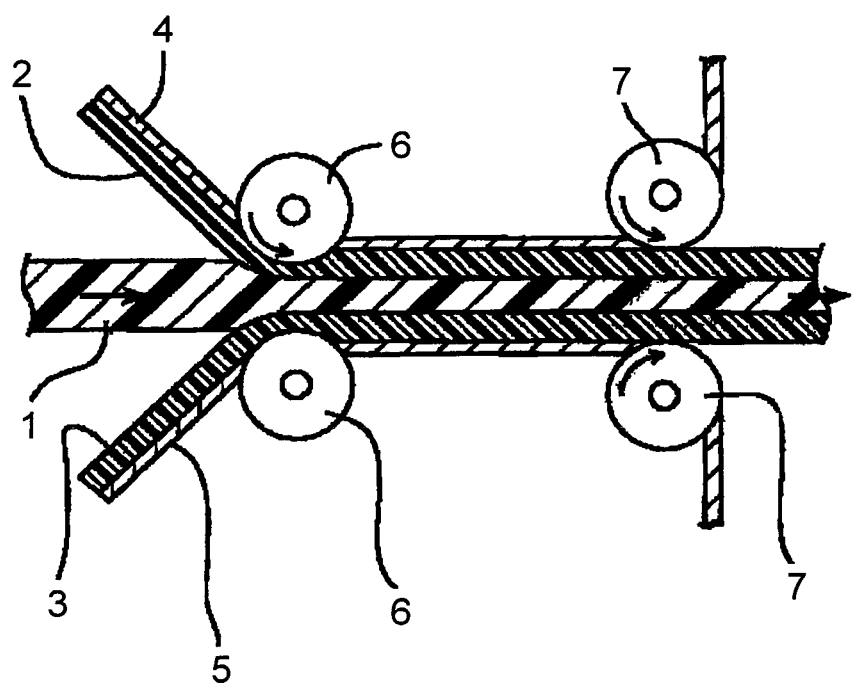
FIG. 1 shows a scheme for producing a membrane electrode assembly involving the use of a conventional hot roller (a hot pressure roller).
Figure 2:
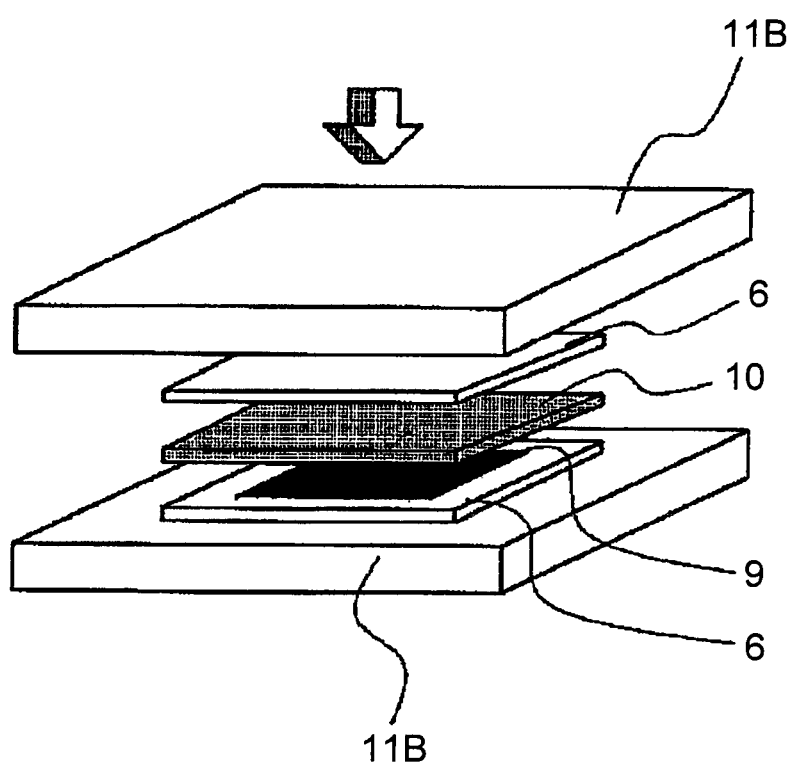
FIG. 2 shows a scheme for producing a membrane electrode assembly involving the use of a conventional hot press.
Figure 3:
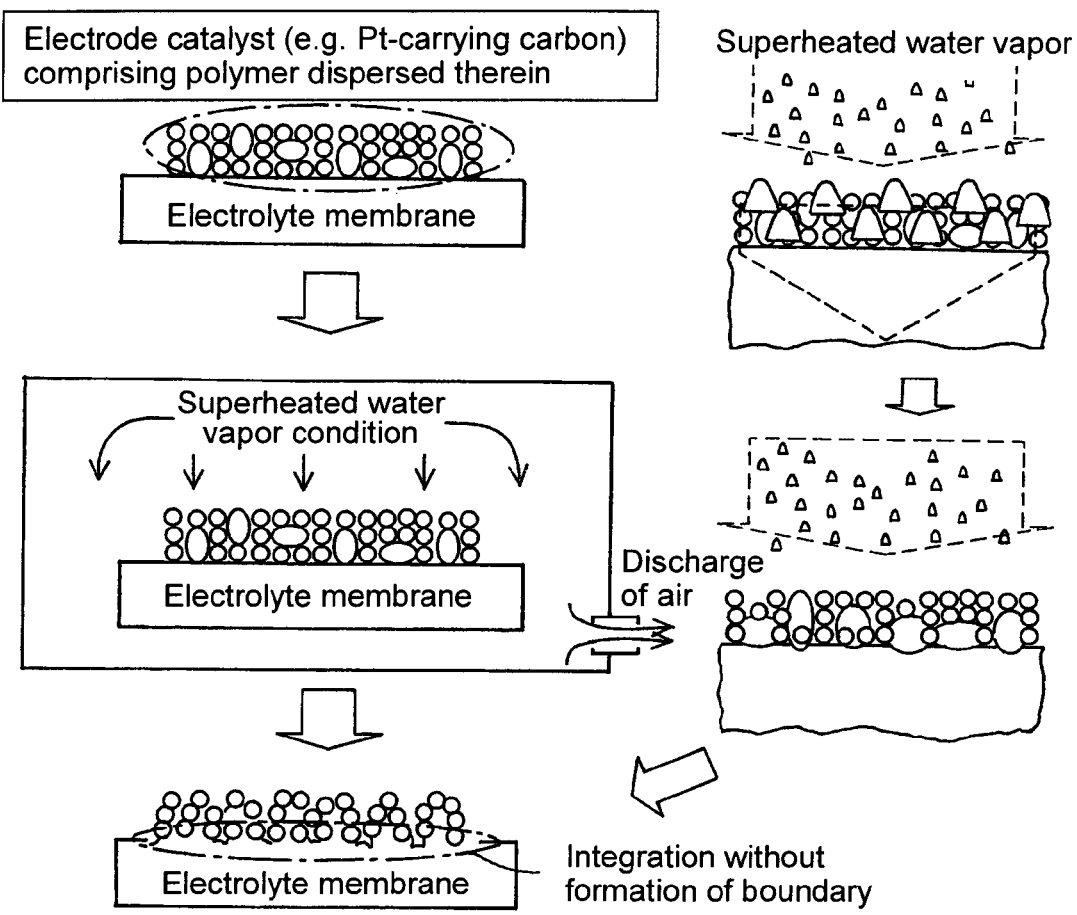
FIG. 3 shows a concept for producing the membrane electrode assembly (MEA) of the present invention.

FIG. 3 shows a concept for producing the membrane electrode assembly (MEA) of the present invention. As shown in FIG. 3, an electrode catalyst, such as polymer-dispersed Pt-carrying carbon, is applied or placed on an electrolyte membrane. The resultant is introduced into a hermetically sealed whole container, and a superheated water vapor is sprayed in the whole container to discharge the air that was initially present, thereby realizing oxygen-free or low-oxygen conditions.

A superheated water vapor is condensed on the surface of the membrane electrode assembly, a condensation heat thereof melts electrolyte resin in the catalyst, and the heat is further transferred to the electrolyte membrane. When the temperature of the membrane electrode assembly is equivalent to that of the electrolyte membrane, condensation is stopped and the superheated water vapor heats the resin directly. Thus, a membrane electrode assembly having an electrolyte membrane integrated with a catalyst layer can be produced without forming a boundary.

Figure 4:
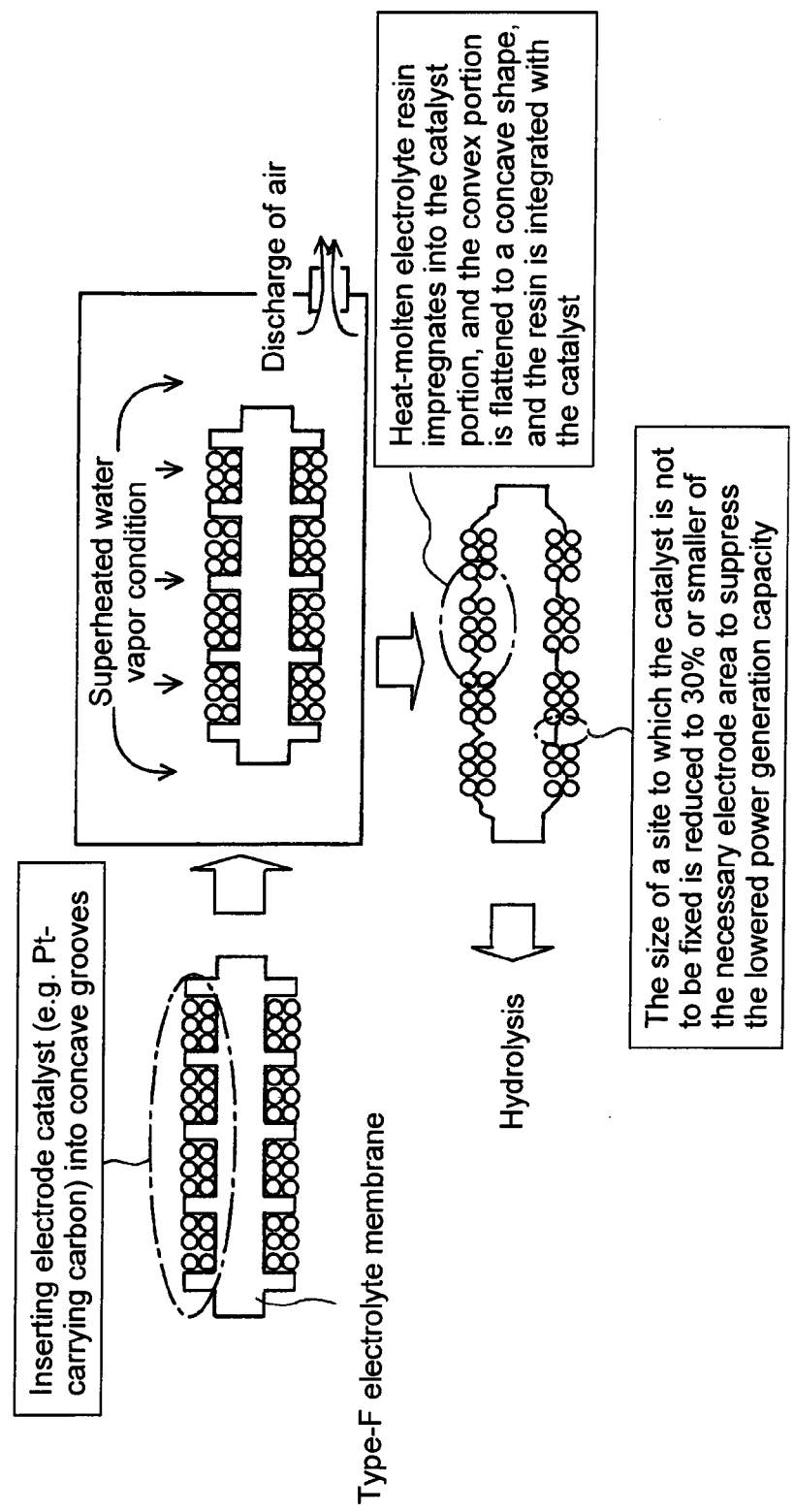
FIG. 4 shows another concept for producing the membrane electrode assembly (MEA) of the present invention.

FIG. 4 shows another concept for producing the membrane electrode assembly (MEA) of the present invention. As shown in FIG. 4, the membrane electrode assembly comprises on the electrolyte membrane surface a concave portion on which a catalyst mixture is applied or placed, and an electrode catalyst such as polymer-dispersed Pt-carrying carbon is applied or placed on the concave portion on the concaved electrolyte membrane. The resultant is introduced into a hermetically sealed whole container, and a superheated water vapor is sprayed into the whole container to discharge the air that was initially present, thereby realizing oxygen-free or low-oxygen conditions.

A superheated water vapor is condensed on the surface of the membrane electrode assembly, a condensation heat thereof melts electrolyte resin in the catalyst, and the heat is further transferred to the electrolyte membrane. When the temperature of the membrane electrode assembly is equivalent to that of the electrolyte membrane, condensation is stopped and the superheated water vapor heats the resin directly. Thus, a membrane electrode assembly in which the electrolyte membrane is integrated with the catalyst layer can be produced without forming a boundary.

Subsequently, heat-molten electrolyte resin impregnates the catalyst portion, the convex portion is flattened to a concave shape, and the electrolyte resin is then integrated with the catalyst. Depression of power generation capacity is suppressed when the size of a site not covered with the catalyst is reduced to 30% or less of the necessary electrode area.

Polymer electrolytes (proton exchange resins) used in the present invention are not particularly limited. Specific examples thereof include polymer electrolytes having sulfonic acid group, carboxylic acid group, or phosphoric acid group as a proton exchange group. Among them, sulfonic acid group is preferable in order to realize fuel cell performance.

As polymer electrolytes, perfluoro-proton exchange resin of a fluoroalkyl copolymer having a fluoroalkyl ether side chain and a perfluoroalkyl main chain is preferably used. Examples include Nafion (trademark) manufactured by DuPont, Aciplex (trademark) manufactured by Asahi Kasei Corporation, Flemion (trademark) manufactured by Asahi Glass Co., Ltd., and Gore-Select (trademark) manufactured by Japan Gore-tex Inc. Examples of partially fluorinated resin include a polymer of trifluorostyrene sulfonic acid and a polyvinylidene fluoride introduced with sulfonic acid groups. Also, a styrene-divinylbenzene copolymer and polyimide resin, which are hydrocarbon proton exchange resins, introduced with sulfonic acid groups are also available. Such resin should be adequately selected in accordance with the applications of a fuel cell or the environment in which a fuel cell is to be used. From the viewpoint of the fuel cell life, a perfluoro resin is preferable. As for a hydrocarbon resin, a partially fluorinated membrane which is partially substituted with fluorine atoms is preferably used.

In addition to a polymer electrolyte (proton exchange resin) consisting of a single type of polymer, a copolymer or a blend polymer of two or more types of polymers, a composite membrane composed of a laminate of two or more types membranes, a membrane prepared by reinforcing the proton exchange membrane with a unwoven fabric or porous film or the like can also be used.

In the present invention, a solvent that dissolves or disperses the polymer electrolyte (proton exchange resin) is not particularly limited, provided that it dissolves or disperses the aforementioned polymer electrolyte, in particular, a polymer electrolyte containing fluorine atoms. A single-component solvent or a mixture of two or more solvents may be used. When a fluorine ion type polymer electrolyte is used, for example, an alcohol or a fluorine-containing solvent is used.

An alcohol having 1 to 4 carbon atoms in a main chain is preferable. Examples of an alcohol that can be used include methyl alcohol, ethyl alcohol, n-propyl alcohol, isopropyl alcohol, and tert-butyl alcohol. If water is mixed with an alcohol, solubility of the polymer electrolyte can be enhanced.

Examples of fluorine-containing solvents include: hydrofluorocarbons, such as 1,1,1,2,3,3-hexafluoropropane, 1,1,2,2,3,3,4,4-octafluorobutane, 1,1,1,2,3,4,4,5,5,5-decafluoropentane, 1,1,1,2,3,4,5,5,5-nonafluoro-2-trifluoromethylpentane, 1,1,1,2,3,3,4,4,5,6,6,6-dodecafluorohexane, and 1,1,1,2,3,4,4,5,5,5-decafluoro-2-trifluoromethylpentane; fluorocarbons, such as perfluoro(1,2-dimethylcyclobutane), perfluorooctane, perfluoroheptane, and perfluorohexane; hydrochlorofluorocarbons, such as 1,1-dichloro-1-fluoroethane, 1,1,1-trifluoro-2,2-dichloroethane, 3,3-dichloro-1,1,1,2,2-pentafluoropropane, and 1,3-dichloro-1,1,2,2,3-pentafluoropropane; fluoroethers, such as 1,1,2,2-tetrafluoroethyl-1,1,1-trifluoroethyl ether and methyl-1,1,1,2,3,3-hexafluoropropyl ether; and fluorine-containing alcohols, such as 2,2,2-trifluoroethanol, 2,2,3,3,3-pentafluoropropanol, and 1,1,1,3,3,3-hexafluoro-2-propanol.

When a non-fluorine type polymer electrolyte is used, a solvent, such as N,N-dimethylformamide (DMF), dimethyl sulfoxide (DMSO), methylene chloride, chloroform, carbon tetrachloride, 1,1,1-trichloroethane, 1,1,2-trichloroethane, trichloroethylene, or perchloroethylene, can be used.

A solvent having a hydrophilic group such as carboxyl group, amino group, carbonyl group and sulfoxyl group in addition to a hydroxyl group is preferable because a solvent content in the polymer electrolyte becomes higher. Specific examples of such solvents having hydrophilic groups include water, formic acid, acetic acid, N-methylpyrrolidone, dimethylacetamide, formaldehyde, acetaldehyde, acetone, and methyl ethyl ketone.

As a solvent for the polymer electrolyte, the above-mentioned solvent may be used alone or as a solvent mixture containing at least one of such solvents. Further, a solvent is preferably heated and pressurized when it is impregnated into a polymer electrolyte from the viewpoint of enhancing the efficiency for swelling the polymer electrolyte. As a solvent used for the polymer electrolyte of the present invention, water is most preferable in terms of, for example, cost, handleability, safety, and influence on the environment.

A porous substrate that is arbitrarily used in the present invention is preferably a film. It is necessary for such porous substrate that it would not dissolve in a solvent for a polymer electrolyte solution and it would not melt at the time of dehydration of the polymer electrolyte solution. It is particularly preferable that the porous substrate comprise a water-repellent polymer. The porous substrate comprising a water-repellent polymer is effective for overcoming the problem in the polymer fuel cell such that dew condensation and retention of water would inhibit supply of electrode reactants. Fluorine resins, such as polytetrafluoroethylene (PTFE), a tetrafluoroethylene-hexafluoropropylene copolymer (FEP), and a tetrafluoroethyl ene-perfluoroalkyl vinyl ether copolymer (PFA), are particularly preferable because of high water repellency. In addition, a non-fluorine film, such as polyethylene terephthalate, polyethylene, polypropylene, or polyimide, can be used.

A catalyst mixture (a catalyst ink) that forms the electrode catalyst layer of the present invention comprises at least a catalyst and a catalyst-carrying conductor (for example, catalyst-carrying carbon is preferable; hereafter a catalyst mixture is described with reference to catalyst-carrying carbon, although it is not limited thereto). The catalyst mixture used in the present invention is composed of, for example, catalyst-carrying carbon, a polymer that forms a catalyst layer by binding catalyst-carrying carbon to another catalyst-carrying carbon, catalyst-carrying carbon to an electrode substrate, or catalyst-carrying carbon to a proton exchange membrane, and a solvent, although it is not particularly limited thereto.

A wide variety of conventional catalysts can be used as catalysts contained in catalyst-carrying carbon. Because of the small activation overvoltage in the catalytic reaction, for example, a noble metal catalyst, such as a platinum, gold, palladium, ruthenium, or iridium catalyst, is preferably used. An alloy, mixture, or the like of such noble metal catalyst comprising two or more types of elements may also be used.

Carbon contained in catalyst-carrying carbon is not particularly limited, and a wide variety of conventional forms of carbon can be used. For example, carbon black, such as oil furnace black, channel black, lamp black, thermal black, and acetylene black, is preferable from the viewpoint of electron conductivity and a large specific surface area.

A polymer to be contained in a catalyst mixture is not particularly limited, and a polymer that would not become deteriorated in the oxidation-reduction atmosphere in a fuel cell is preferable. An example of such polymer is a polymer containing a fluorine atom. Specific examples include, but are not particularly limited to, polyvinyl fluoride (PVF), polyvinylidene fluoride (PVDF), polyhexafluoropropylene (FEP), polytetrafluoroethylene, polyperfluoroalkyl vinyl ether (PFA), a copolymer of any thereof, a copolymer of any monomer unit thereof and another monomer such as ethylene and styrene, and a polymer blend thereof.

A polymer to be contained in a catalyst mixture is preferably an electrolyte polymer having a proton exchange group in order to improve proton conductivity in the electrode catalyst layer. Examples of proton exchange groups contained in such polymer include, but are not particularly limited to, a sulfonic acid group, a carboxylic acid group, and a phosphoric acid group. Also, a polymer having such a proton exchange group may be selected without particular limitation, and a fluoroalkyl copolymer having a fluoroalkyl ether side chain comprising a proton exchange group is preferably used. A preferable example is Nafion (DuPont). The aforementioned polymer containing a fluorine atom having a proton exchange group, another polymer such as ethylene or styrene, or a copolymer or polymer blend thereof may also be used.

A polymer contained in a catalyst mixture is preferably used in the form of a copolymer or polymer blend of the polymer containing a fluorine atom or the polymer containing a proton exchange group. For example, a blend of a polyvinylidene fluoride or poly(hexafluoropropylene-vinylidene fluoride) copolymer with a polymer, such as Nafion, having a fluoroalkyl ether side chain and a fluoroalkyl main chain in the proton exchange group is preferable from the viewpoint of electrode performance.

In the present invention, the solvent contained in a catalyst mixture is the same as the solvent that dissolves or disperses the polymer electrolyte. Such solvent is not particularly limited, provided that it dissolves or disperses a polymer, and, in particular, a polymer containing a fluorine atom or a polymer containing a proton exchange group. Specifically, solvents containing hydrophilic groups, such as hydroxyl group, carboxyl group, amino group, carbonyl group and sulfoxyl group, are preferable because they make the solvent content of the proton exchange membrane higher. Specific examples of such solvents having hydrophilic groups include water, methanol, ethanol, n-propyl alcohol, isopropyl alcohol, formic acid, acetic acid, N-methylpyrrolidone, dimethylformamide, dimethylacetamide, formaldehyde, acetaldehyde, acetone, methyl ethyl ketone, and dimethyl sulfoxide. As a solvent contained in the mixture, the above-mentioned solvent may be used alone or as a solvent mixture containing at least one of such solvents.

The main components of a catalyst mixture are preferably a catalyst-carrying conductor, such as catalyst-carrying carbon, and a polymer electrolyte, and the ratio of the catalyst-carrying conductor to the polymer electrolyte should be adequately determined in accordance with the electrode characteristics of interest, without particular limitation. The catalyst-carrying conductor:polymer electrolyte ratio is preferably 5:95 to 95:5 by weight. When used as an electrode catalyst layer for a polymer fuel cell, in particular, the catalyst-carrying conductor:polymer electrolyte ratio is preferably 40:60 to 85:15 by weight.

The catalyst mixture preferably comprises a variety of conductors in order to improve electron conductivity, in addition to the catalyst-carrying conductor. In addition to carbon black of the same type as the carbon used for the above catalyst-carrying conductor, a variety of graphite or carbonaceous carbon materials, metals, semimetals, and the like may be used, without particular limitation. Examples of carbon materials include natural graphite and artificial graphites or carbons obtained from organic compounds such as pitch, coke, polyacrylonitrile, phenolic resin and furan resin, in addition to the aforementioned carbon black. Such carbon materials may be in the form of particles or fibers. Also, carbon materials obtained by subjecting the aforementioned carbon materials to post-treatment can be used. The amount of conductors to be added is preferably 1% to 80%, and more preferably 5% to 50% of the electrode catalyst layer by weight.

In the present invention, a method for forming a catalyst mixture on the surface of an undried electrolyte membrane is not particularly limited. The catalyst-carrying conductor, the polymer electrolyte, and the solvent contained in the electrode catalyst layer are kneaded into a paste, and a mixed solution (a catalyst ink) may be directly applied and formed on the electrolyte membrane by brush painting, writing brush painting, bar coating, knife coating, screen printing, spray coating, or other means. Alternatively, an electrode catalyst layer may be formed on another substrate (i.e., a transfer substrate), and the resultant may then be transferred to the gas diffusion layer or a proton exchange membrane. In such a case, for example, a polytetrafluoroethylene (PTFE) sheet or a glass plate or metal plate with surfaces treated with a fluorine- or silicone-type release agent may be used as a transfer substrate.

In the present invention, the one comprising a gas diffusion layer (an electrode substrate) in addition to the above polymer electrolyte membrane layer and the electrode catalyst layer may be referred to as a membrane electrode assembly. The membrane electrode assembly of the present invention may comprise a gas diffusion layer (an electrode substrate) in addition to the above polymer electrolyte membrane layer and the electrode catalyst layer.

As a gas diffusion layer (an electrode substrate), a gas diffusion layer that is generally used for a fuel cell may be used without particular limitation. For example, a porous conductive sheet mainly composed of a conductive material can be used. Examples of a conductive material include a calcined product of polyacrylonitrile, a calcined product of a pitch, carbon materials such as graphite and expanded graphite, stainless steel, molybdenum, and titanium. A conductive material may be fibrous or particulate without particular limitation. When a conductive material is used for an electrochemical apparatus involving the use of gas as an electrode active material, such as in a fuel cell, a fibrous, conductive, and inorganic substance (an inorganic conductive fiber), in particular a carbon fiber, is preferable from the viewpoint of gas permeability. A porous conductive sheet using an inorganic conductive fiber may be composed of a woven or unwoven fabric. A porous conductive sheet used in the present invention is not particularly limited. In order to improve conductivity, conductive particles, such as carbon black particles, or conductive fibers, such as carbon fibers, may be preferably added as auxiliary materials.

The gas diffusion layer comprises a carbon fiber paper composed of polymer-bound short carbon fibers that are randomly aligned on a substantially two-dimensional surface, in addition to the gas diffusion layer. By binding short carbon fibers with polymers, the carbon fiber paper becomes less susceptible to compression or tension, and strength and handleability of carbon fiber paper are improved. This can prevent short carbon fibers from coming off of the carbon fiber paper or facing in the thickness direction of the carbon fiber paper.

The gas diffusion layer preferably comprises a porous conductive sheet composed of flexible conductive particles aligned in a sheet-like manner. This can provide a gas diffusion layer from which constituents are less likely to drop out, which is less likely to break upon application of mechanical force, which has low electric resistance, and which is inexpensive. Use of expanded graphite particles as the flexible conductive particles is particularly effective. The term "expanded graphite particles" used herein refers to graphite particles that are obtained by preparing an intercalation compound of graphite particles with sulfuric acid, nitric acid, or the like and rapidly heating the intercalation compound, thereby expanding the resultant.

The porous conductive sheet used for the gas diffusion layer preferably comprises other conductive particles or conductive fibers, in addition to the flexible conductive fine particles. Use of such conductive fibers and conductive particles composed of inorganic materials enables the production of an electrode substrate having excellent heat resistance, oxidation resistance, and elution resistance.

When assembling the electrolyte membrane and the catalyst layer in the present invention, pressure of 1 MPa or lower is applied, or no pressure is preferably applied. Even when pressure or 1 MPa or lower or no pressure is applied, a mixed solution (a catalyst ink) sufficiently impregnates the electrolyte membrane, and the catalyst layer is sufficiently assembled with the electrolyte membrane. Ion resistance at the boundary between the electrolyte membrane and the catalyst layer is low.

The membrane electrode assembly of the present invention is suitable for a polymer fuel cell. The membrane electrode assembly may be used for a fuel cell involving the use of a hydrogen fuel, a fuel cell involving the use of a hydrocarbon fuel such as methanol, or other types of fuel cells without particular limitation. Applications of the fuel cell utilizing the membrane electrode assembly of the present invention are not particularly limited, and the fuel cell is desirable as a power source for an automobile, which is a useful application of a polymer fuel cell.

EXAMPLES

Hereafter, the present invention is described in greater detail with reference to the examples, although the technical scope of the present invention is not limited thereto.

Example 1

Figure 5:
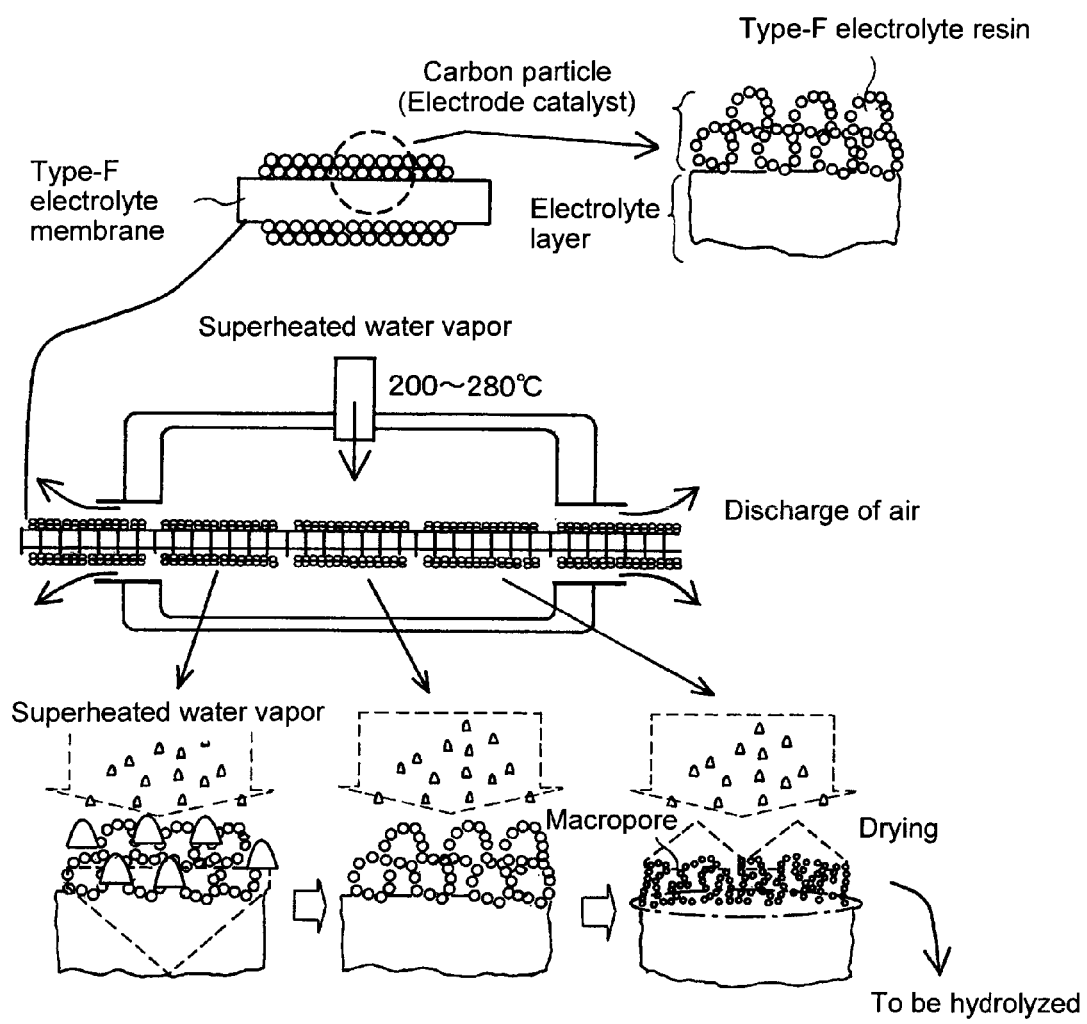
FIG. 5 shows a concept for producing the membrane electrode assembly (MEA) of Example 1.

FIG. 5 shows a concept for producing the membrane electrode assembly (MEA) of Example 1. As shown in FIG. 5, an electrode catalyst comprising type-F electrolyte resin, Pt-carrying carbon, and the like dispersed therein is applied to the surface of the type-F electrolyte membrane by using electrostatic powder coating technique or other means. The coated precursor of the membrane electrode assembly is introduced into a container having the superheated water vapor atmosphere, and the electrolyte membrane surface and the catalyst are simultaneously heated with the utilization of the water vapor energy to integrate the electrolyte membrane with the catalyst.

The superheated water vapor is 200° C. to 280° C. at ambient pressure and 100% water vapor (oxygen-free and nitrogen-free conditions). The precursor of the membrane electrode assembly continuously migrates within the container.

Subsequently, the superheated water vapor is condensed on the surface of the precursor of the membrane electrode assembly, the condensation heat thereof melts the electrolyte resin in the catalyst, and heat is further transferred to the electrolyte membrane. When the temperature of the precursor of the membrane electrode assembly is equivalent to that of the electrolyte membrane, condensation is stopped and the superheated water vapor heats the resin directly.

Simultaneously with the integration of the precursor of the membrane electrode assembly and the catalyst layer, the superheated water vapor then discharges unwanted substances and water from the precursor of the membrane electrode assembly. Thus, a precursor of the membrane electrode assembly that has substantially no boundary and has a porous catalyst layer, is produced. The precursor of the membrane electrode assembly is still in the form of a type-F electrolyte membrane. Accordingly, it is subjected to hydrolysis in a later step to prepare into the form of a type-H electrolyte membrane.

Example 2

Figure 6:
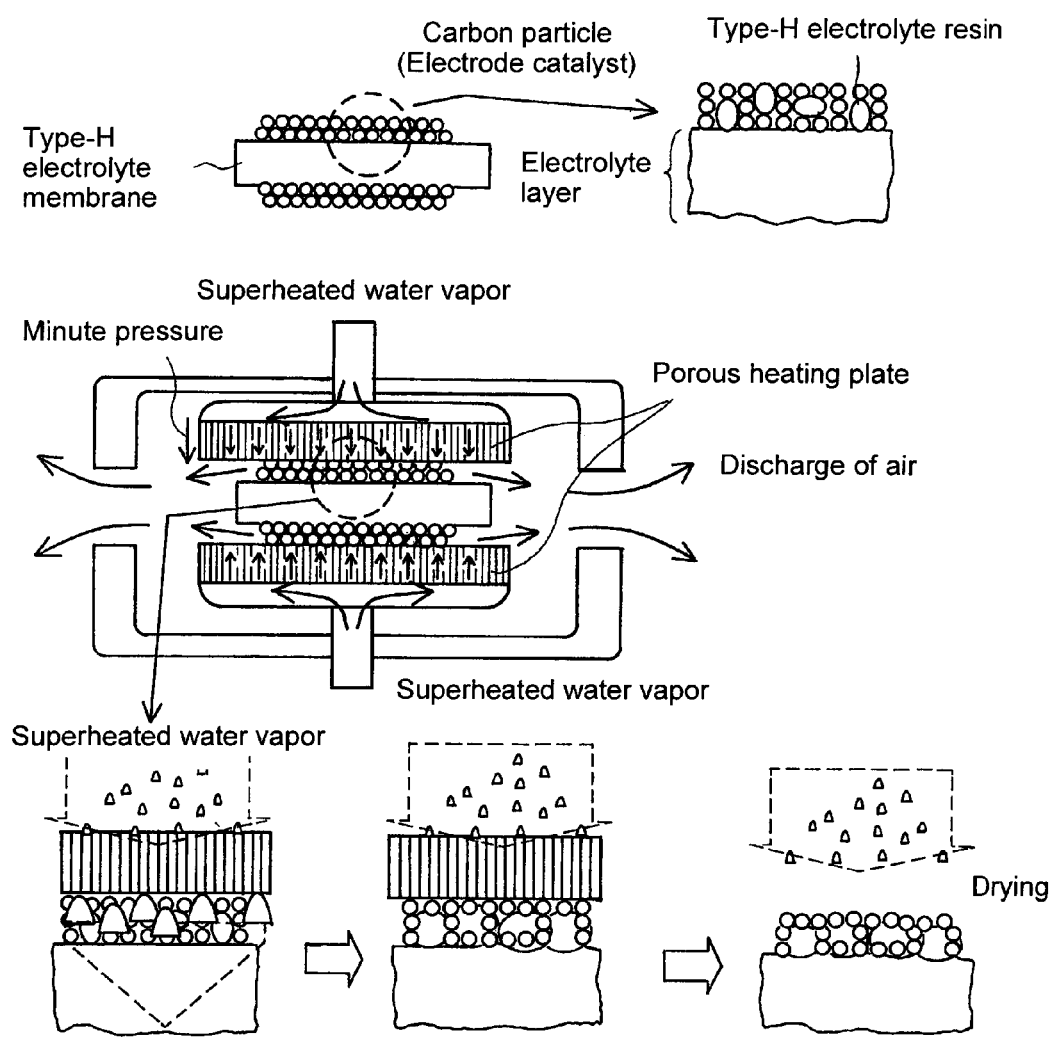
FIG. 6 shows a concept for producing the membrane electrode assembly (MEA) of Example 2.

FIG. 6 shows a concept for producing the membrane electrode assembly (MEA) of Example 2. As shown in FIG. 6, an electrode catalyst comprising type-H electrolyte resin, Pt-carrying carbon, and the like dispersed therein is applied to the surface of the type-H electrolyte membrane. The resultant is introduced into the atmosphere in which water vapor is saturated to superheated (approximately 100° C. to 150° C., in particular). The electrolyte membrane and the electrolyte resin in the catalyst absorb moisture. Water vapor is condensed and absorbed while uniformly transferring heat to the electrolyte membrane and the catalyst. At this time, the electrolyte membrane and the electrolyte resin in the catalyst are swollen and softened and then dried by the superheated water vapor. At the same time, the catalysts can be fixed to the electrolyte membrane.

The type-H electrolyte membrane was used in Example 2. Thus, the superheated water vapor is 100° C. to 150° C. at ambient pressure and 100% water vapor (oxygen-free and nitrogen-free conditions). The superheated water vapor is sprayed onto the membrane electrode assembly via a porous heating plate.

While applying a pressure equivalent to the weight of the heating plate, water vapor is condensed on the surface of the precursor of the membrane electrode assembly, the condensation heat thereof softens the electrolyte resin in the catalyst and the membrane surface, and the electrolyte resin and the membrane absorb the condensed water and swell. Thus, adhesion at the contact region of the catalyst and the resin is improved.

While applying a pressure equivalent to the weight of the heating plate, the equivalent temperature between the precursor of the membrane electrode assembly and in the electrolyte membrane that adheres via swelling in turn avoids condensation, and this results in direct heating of resin by a superheated water vapor.

Subsequently, the superheated water vapor then discharges unwanted substances and water from the precursor of the membrane electrode assembly, and the catalyst is fixed to the membrane surface. Thus, a precursor of the membrane electrode assembly that has substantially no boundary and has a porous catalyst layer is produced.

Example 3

Figure 7:
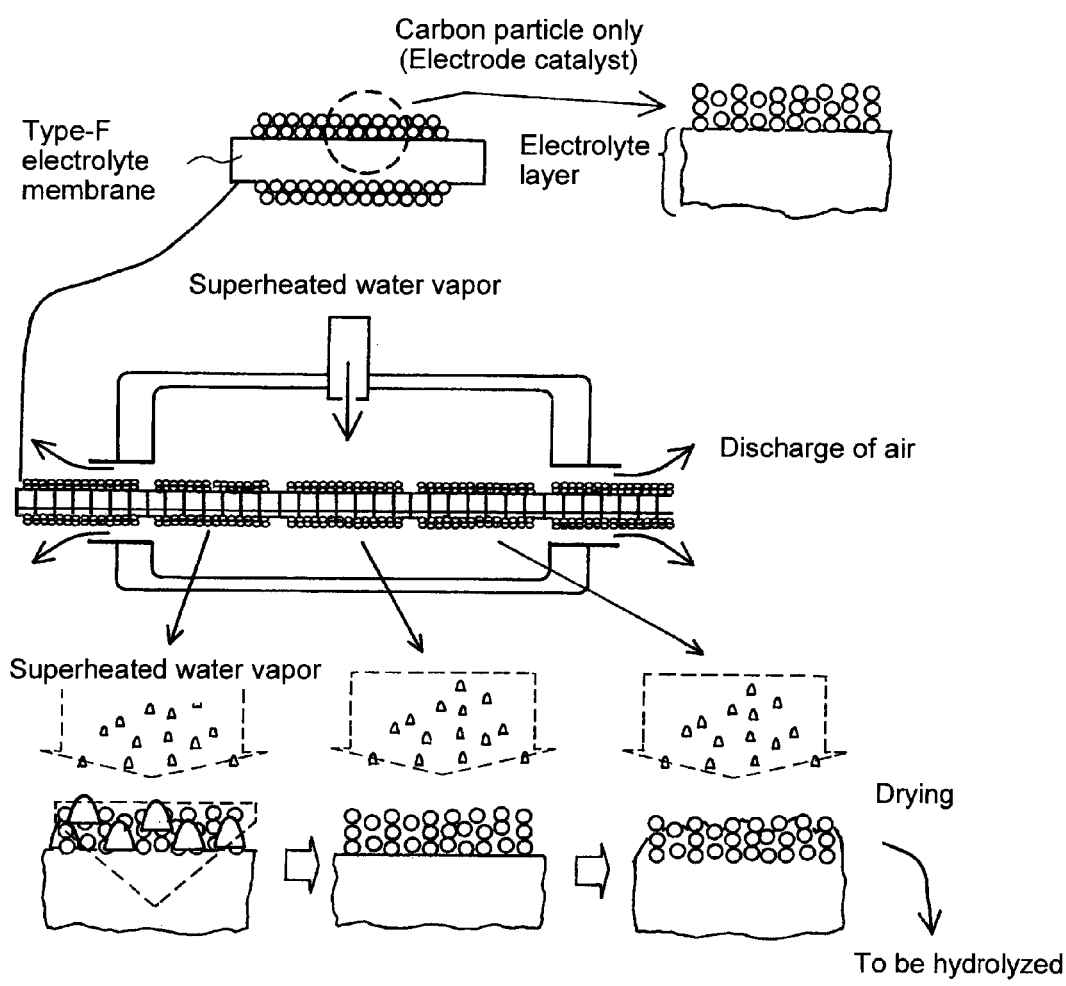
FIG. 7 shows a concept for producing the membrane electrode assembly (MEA) of Example 3.

FIG. 7 shows a concept for producing the membrane electrode assembly (MEA) of Example 3. As shown in FIG. 7, an electrode catalyst comprising Pt-carrying carbon and the like dispersed therein is applied to the surface of the type-F electrolyte membrane by using electrostatic powder coating technique or other means. The coated precursor of the membrane electrode assembly is introduced into a container having the superheated water vapor atmosphere, and the electrolyte membrane surface and the electrode catalyst are simultaneously heated with the utilization of the water vapor energy to soften and melt the electrolyte membrane surface. The molten electrolyte resin impregnates open areas of the catalyst particles by capillary action, and the electrolyte resin and the catalyst are then integrated. As in the case of Example 2, a pressure equivalent to the weight of the porous heating plate, which has been placed onto the top surface of the catalyst in advance, may be applied to accelerate the integration.

The type-F electrolyte membrane was used in Example 3. The superheated water vapor is 200° C. to 280° C. at ambient pressure and 100% water vapor (oxygen-free and nitrogen-free conditions). The precursor of the membrane electrode assembly continuously migrates within the container.

Superheated water vapor is condensed on the surface of the precursor of the membrane electrode assembly, the condensation heat thereof melts the electrolyte resin in the catalyst, and heat is further transferred to the electrolyte membrane.

Subsequently, when the temperature of the precursor of the membrane electrode assembly is equivalent to that of the electrolyte membrane, condensation is stopped and the resin is molten via direct heating by superheated water vapor.

Subsequently, resin on the surface of the membrane molten by the superheated water vapor moves toward the electrode catalyst. The molten resin impregnates. Thus, a precursor of the membrane electrode assembly that has substantially no boundary and has a porous catalyst layer is produced. The precursor of the membrane electrode assembly is still in the form of a type-F electrolyte membrane. Accordingly, it is subjected to hydrolysis in a later step to prepare into the form of a type-H electrolyte membrane.

Example 4

Figure 8:
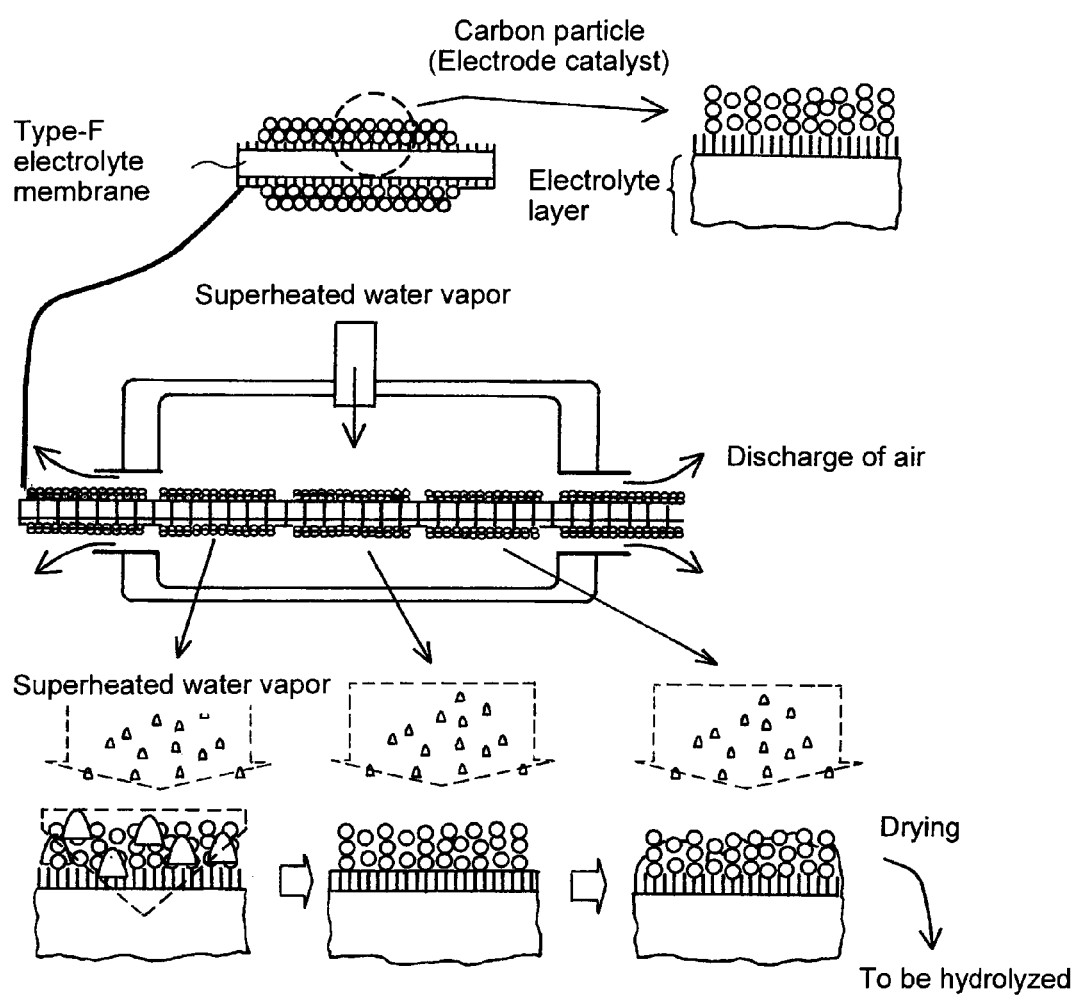
FIG. 8 shows a concept for producing the membrane electrode assembly (MEA) of Example 4.

FIG. 8 shows a concept for producing the membrane electrode assembly (MEA) of Example 4. As shown in FIG. 8, an electrode catalyst, such as Pt-carrying carbon, is applied to the surface of the type-F electrolyte membrane by using electrostatic powder coating technique or other means via a reinforcing member (e.g., a PTFE porous membrane). The coated precursor of the membrane electrode assembly is introduced into a container having the superheated water vapor atmosphere, and the electrolyte membrane surface and the electrode catalyst are simultaneously heated with the utilization of the water vapor energy to soften and melt the electrolyte membrane surface. The molten resin impregnates open areas of the reinforcing member and the catalyst particles by capillary action, and the electrolyte resin and the catalyst are then integrated. As in the case of Example 5, a pressure equivalent to the weight of the porous heating plate, which has been placed onto the top surface of the catalyst in advance, may be applied to accelerate the integration.

The type-F electrolyte membrane was used in Example 4. Thus, the superheated water vapor is 200° C. to 280° C. at ambient pressure and 100% water vapor (oxygen-free and nitrogen-free conditions). The precursor of the membrane electrode assembly continuously migrates within the container.

Superheated water vapor is condensed on the surface of the precursor of the membrane electrode assembly, the condensation heat thereof melts the electrolyte resin in the catalyst, and heat is further transferred to the electrolyte membrane.

Subsequently, when the temperature of the precursor of the membrane electrode assembly is equivalent to that of the electrolyte membrane, condensation is stopped and the resin is molten by direct heating by a superheated water vapor.

Subsequently, resin on the surface of the membrane molten by the superheated water vapor moves toward the electrode catalyst. The molten resin impregnates. Thus, a precursor of the membrane electrode assembly that has substantially no boundary and has a porous catalyst layer is produced. The precursor of the membrane electrode assembly is still in the form of a type-F electrolyte membrane. Accordingly, it is subjected to hydrolysis in a later step to prepare into the form of a type-H electrolyte membrane.

Example 5

Figure 9:
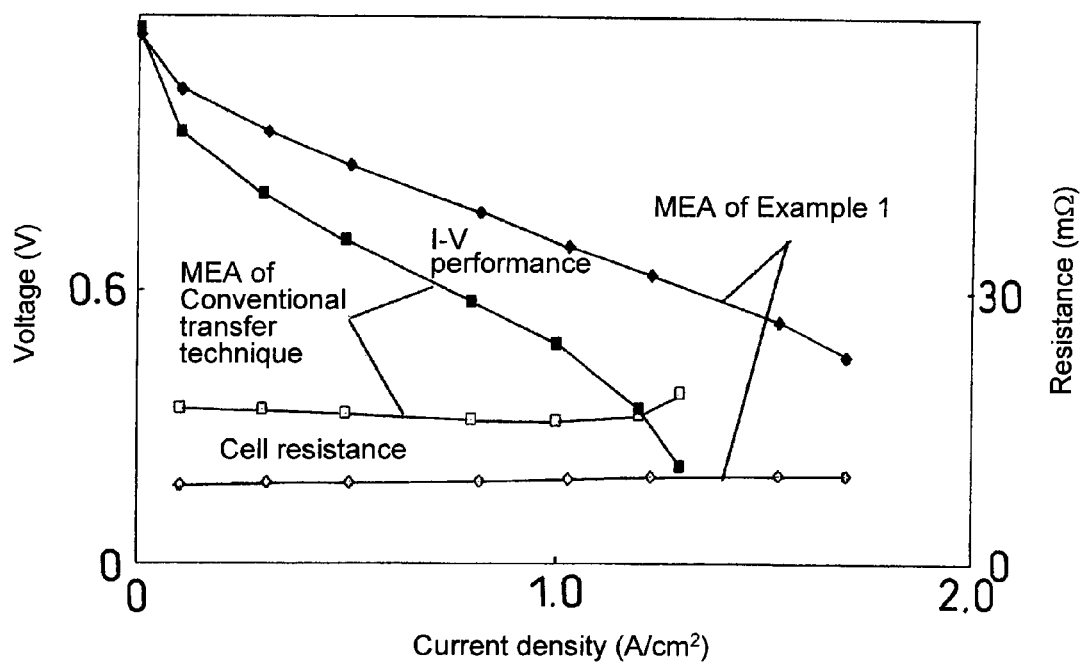
FIG. 9 shows the correlation between the current density and the voltage (the I-V curve) and the correlation between the current density and the electric resistance of the membrane electrode assembly obtained in Example 1 and the membrane electrode assembly obtained by a conventional thermal transfer technique (i.e., hot pressing).

The electrode catalyst, such as Pt-carrying carbon, is selectively applied to the surface of the type-H electrolyte membrane by using electrostatic powder coating technique or other means in the same manner as in Example 3. In the coated state, the surface of the electrolyte membrane is sufficiently swollen and softened under water and alcohol-vapor-saturated conditions (30° C. to 90° C.). In the softened state, minute pressure is applied to the top surface of the catalyst, and the softened resin impregnates the catalyst. The atmosphere in the container is switched from the vapor-saturated atmosphere to a superheated water vapor atmosphere consisting of water (approximately 100° C. to 150° C., in particular). The electrolyte resin that has entered into the membrane and the catalyst absorb moisture, the membrane and the resin are dried by superheated water vapor, and the catalyst can be fixed to the membrane simultaneously therewith. Thus, a precursor of the membrane electrode assembly that has substantially no boundary and has a porous catalyst layer is produced.
[Evaluation of Cell Properties]
FIG. 9 shows the correlation between the current density and the voltage (the I-V curve) and the correlation between the current density and the electric resistance of the membrane electrode assembly obtained in Example 1 and the membrane electrode assembly obtained by a conventional thermal transfer technique (i.e., hot pressing). The details of the evaluation test for cell properties are as follows.
(Constant Current Measurement: Low Humidity)
Cell inlet temperature: 80° C.
Dew point: AN/CA=45/55° C.
The results shown in FIG. 9 demonstrate that the membrane electrode assembly of the present invention can realize remarkable improvement in properties (+70%) at low humidity conditions. Further, improved gas diffusion and fixation of the electrolyte resin in the catalyst (improved conditions for three-phase boundary formation) enable power generation in the high-current region at drier conditions without drastically lowering the voltage.

Example 6

Figure 10:
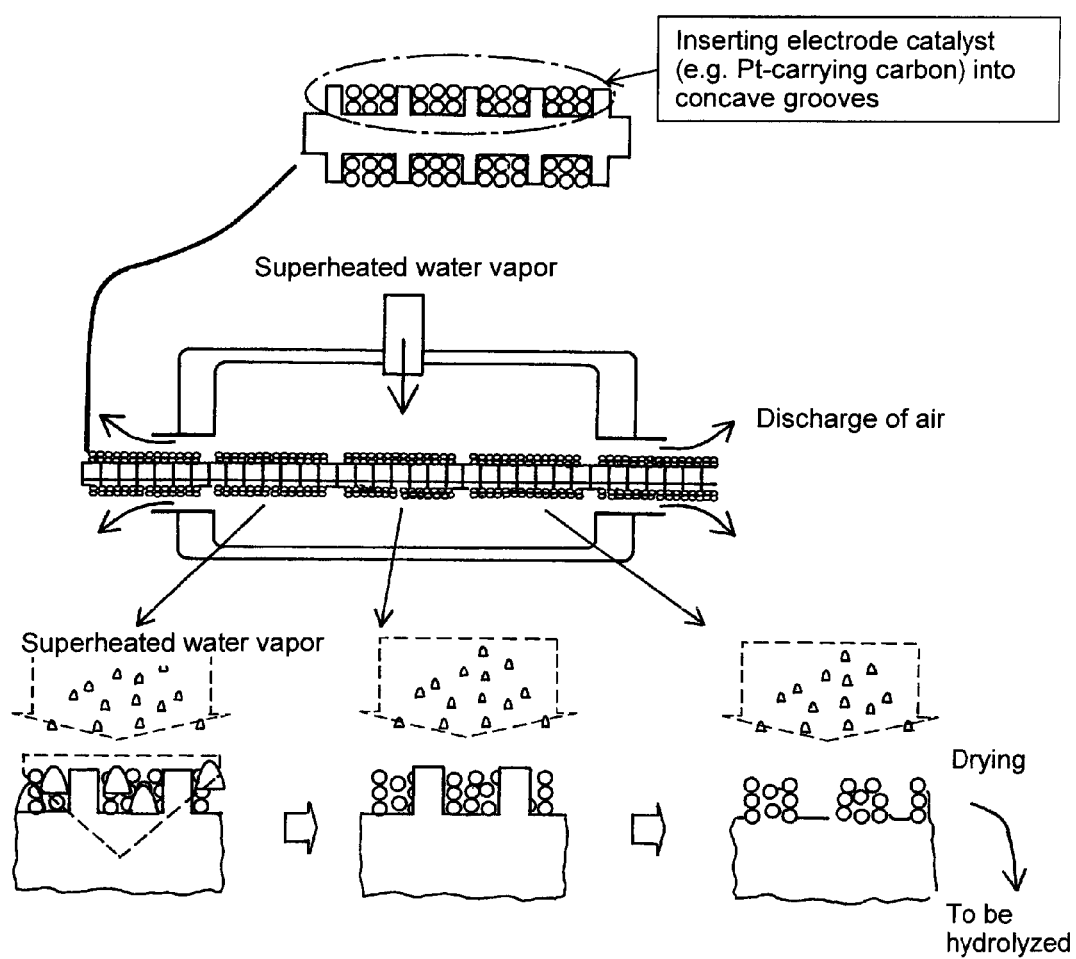
FIG. 10 shows a concept for producing the membrane electrode assembly (MEA) of Example 6.

FIG. 10 shows a concept for producing the membrane electrode assembly (MEA) of Example 6. As shown in FIG. 10, the concavities on the surface of the type-F electrolyte membrane are coated with an electrode catalyst, such as Pt-carrying carbon, by using electrostatic powder coating technique or other means. In the coated state, the resultant is introduced into a container having the superheated water vapor atmosphere, and the electrolyte membrane surface and the electrode catalyst are simultaneously heated with the utilization of the water vapor energy to soften and melt the electrolyte membrane surface and the convexities. The molten resin impregnates open areas of the catalyst particles by capillary action, and the electrolyte resin and the catalyst are then integrated. Also, a heating plate or the like may be applied onto the top surface of the catalyst in advance to apply a pressure equivalent to the weight of the heating plate, thereby accelerating the integration.

The type-F electrolyte membrane was used in Example 6. Thus, the superheated water vapor is 200° C. to 280° C. at ambient pressure and 100% water vapor (oxygen-free and nitrogen-free conditions). The precursor of the membrane electrode assembly continuously migrates within the container.

Superheated water vapor is condensed on the surface of the precursor of the membrane electrode assembly, the condensation heat thereof melts the electrolyte resin in the catalyst, and heat is further transferred to the electrolyte membrane.

Subsequently, when the temperature of the catalyst portion of the precursor of the membrane electrode assembly is equivalent to that of the electrolyte membrane, condensation is stopped and the resin is molten via direct heating by superheated water vapor.

Subsequently, resin on the surface of the membrane that becomes molten by the superheated water vapor moves toward the electrode catalyst. The molten electrolyte resin impregnates the catalyst by capillary action, and the resin and the catalyst are then integrated. Thus, a precursor of the membrane electrode assembly that has substantially no boundary and has a porous catalyst layer is produced. The precursor of the membrane electrode assembly is still in the form of a type-F electrolyte membrane. Accordingly, it is subjected to hydrolysis in a later step to prepare into the form of a type-H electrolyte membrane.

Example 7

Figure 11:
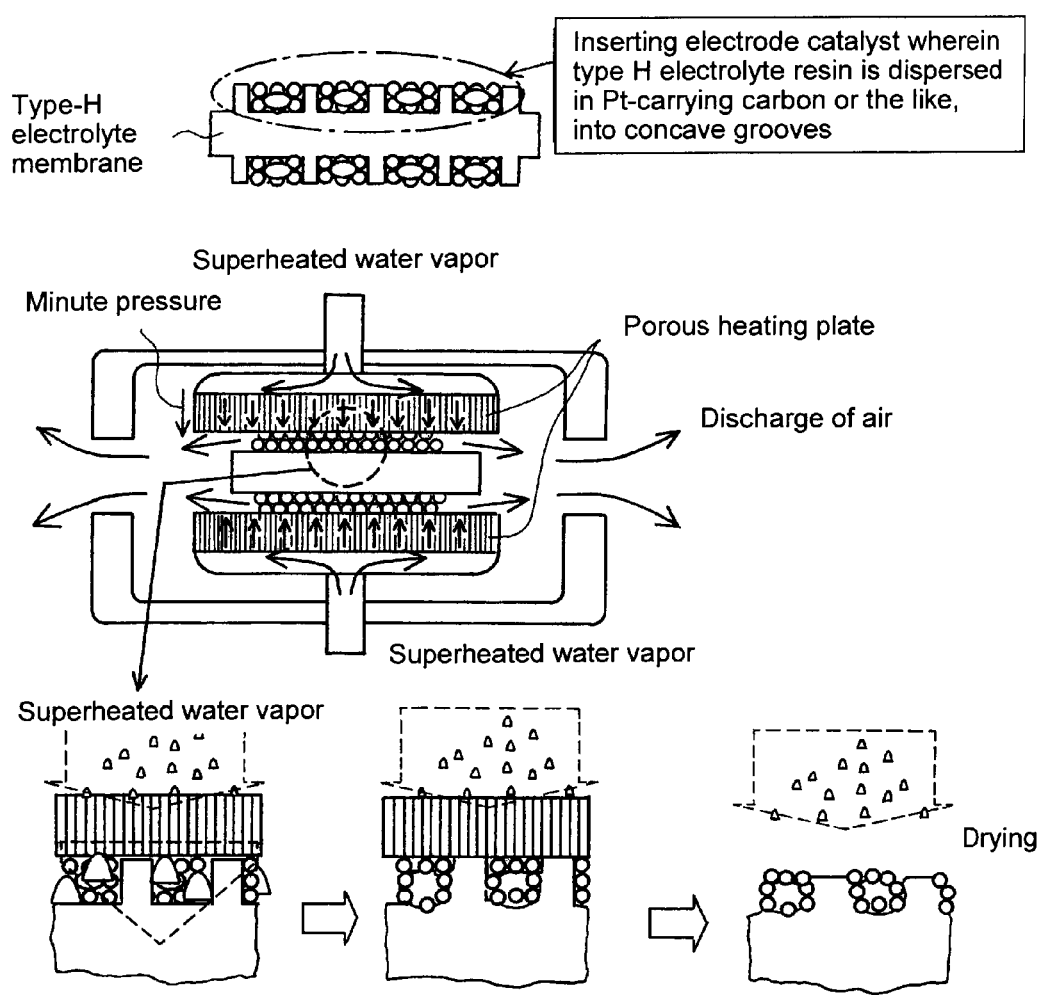
FIG. 11 shows a concept for producing the membrane electrode assembly (MEA) of Example 7.

FIG. 11 shows a concept for producing the membrane electrode assembly (MEA) of Example 7. As shown in FIG. 11, the electrode catalyst comprising the type-H electrolyte resin, Pt-carrying carbon, and the like dispersed therein is applied to the surface of the type-H electrolyte membrane. The membrane and the electrolyte resin in the catalyst are allowed to absorb water in the vapor-saturated state comprising water or water and alcohol at a temperature lower than 90° C. The resultant is introduced into the superheated water vapor atmosphere (approximately 100° C. to 150° C., in particular), excess water is condensed in the catalyst, and the electrolyte resin is liquefied. At the same time, water vapor can uniformly transfer the condensation heat to the electrolyte membrane and the catalyst. In this case, application of a pressure equivalent to the weight of the plate results in adhesion of the electrolyte membrane and catalyst layer, the resultant is dried by superheated water vapor, and the catalyst can be fixed to the membrane simultaneously therewith.

The type-H electrolyte membrane was used in Example 7. Thus, the superheated water vapor is 100° C. to 150° C. at ambient pressure and 100% water vapor (oxygen-free and nitrogen-free conditions). The superheated water vapor is sprayed onto the membrane electrode assembly via a porous heating plate.

While applying a pressure equivalent to the weight of the heating plate, water vapor is condensed on the surface of the precursor of the membrane electrode assembly, the condensation heat thereof softens the electrolyte resin in the catalyst and the membrane surface, and the electrolyte resin and the membrane absorb the condensed water and swell. Thus, adhesion at the contact region of the catalyst and the resin is improved.

While applying a pressure equivalent to the weight of the heating plate, the equivalent temperature between the precursor of the membrane electrode assembly and in the electrolyte membrane that adheres via swelling in turn avoids condensation, and this in turn results in direct heating of resin by a superheated water vapor.

Subsequently, the superheated water vapor then discharges unwanted substances and water from the precursor of the membrane electrode assembly, and the catalyst is fixed to the electrolyte membrane surface. Thus, a precursor of the membrane electrode assembly that has substantially no boundary and has a porous catalyst layer is produced.

With the utilization of concave grooves on the electrolyte membrane surface as in the case of Examples 6 and 7, a catalyst can be inhibited from protruding from the edge of the membrane electrode assembly. Since the groove may be formed freely, a catalyst layer that fits the relevant gas channel can be formed.

Figure 12:
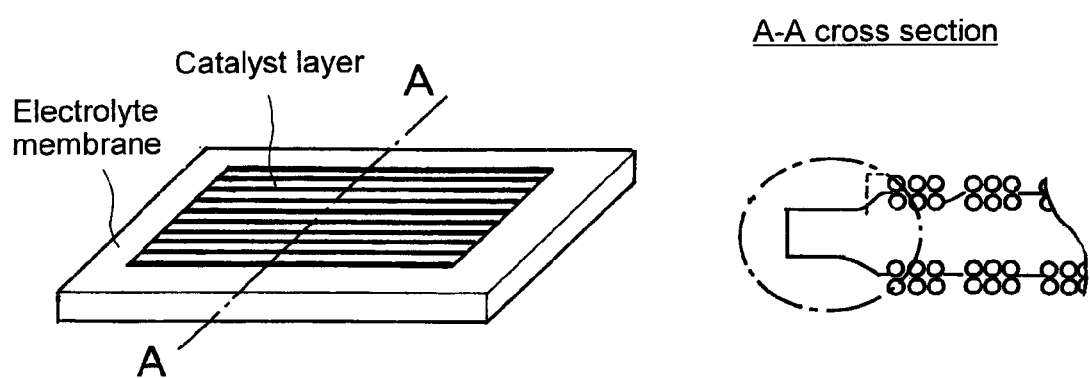
FIG. 12 explains a function for inhibiting a catalyst from protruding from an electrolyte membrane having a concave groove on which a catalyst layer is applied or placed.

A function for inhibiting a catalyst from protruding from the electrolyte membrane is described with reference to FIG. 12. The cross section of the electrolyte membrane comprising the concave grooves on which the catalyst layer is applied or placed enables prevention of the catalyst from protruding from the edge by introducing the catalyst into the electrolyte membrane of the convex portions of the membrane edge. This can prevent misalignment of a catalyst layer or insufficient sealing of a cell, which have been problematic in the past.

Figure 13:
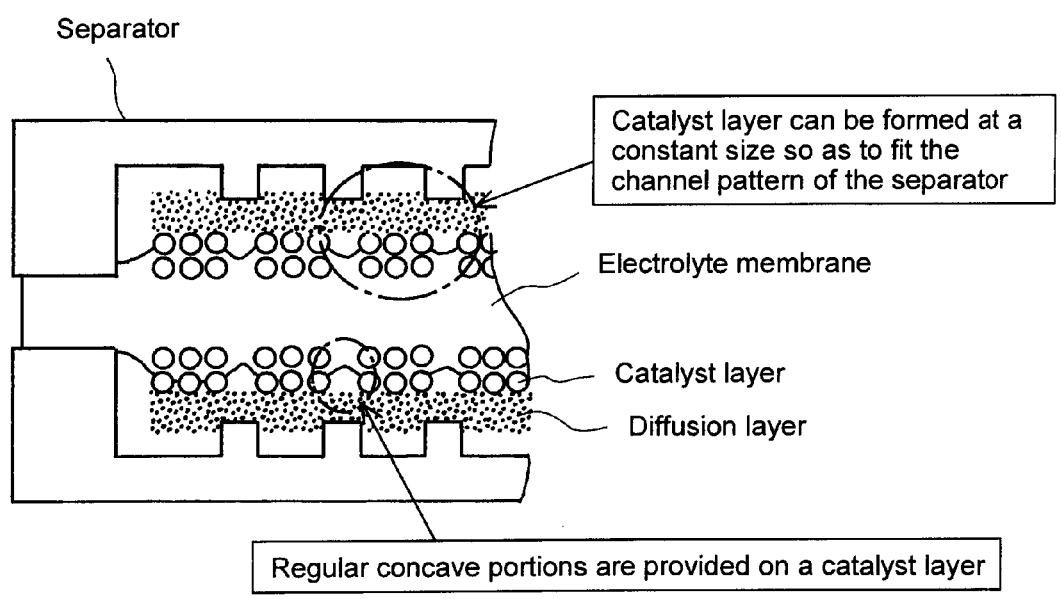
FIG. 13 explains formation of a catalyst layer pattern along with a gas channel in an electrolyte membrane wherein a catalyst layer is applied or placed on a concave groove.

Also, formation of a catalyst layer pattern fitted with a gas channel is described with reference to FIG. 13. Since the catalyst layer can be positioned with a constant size in accordance with a channel pattern of the separator, a catalyst may be positioned in a region with sufficient gas diffusion. This enables effective use of the catalyst, and it allows reduction of the amount of catalyst without causing deterioration in the performance. Since concavities can be formed regularly on the catalyst layer, functions of discharging excess water or retaining moisture at low humidity conditions can be provided.

INDUSTRIAL APPLICABILITY

The present invention enables the production of the membrane electrode assembly that is substantially free of boundaries and that has a catalyst layer in which porous and sufficient three-phase boundaries is formed. The absence of a boundary can result in improved drainage of water generated at the electrode and durability of a fuel cell. As a result, the present invention can realize the production of a fuel cell having power generation capacity that is higher than that of conventional membrane electrode assemblies. Thus, the present invention contributes to practical application and wider adoption of fuel cells.

The invention claimed is:

1. A method for producing a membrane electrode assembly comprising steps of:
    preparing a precursor of the membrane electrode assembly wherein a catalyst mixture comprising an electrolyte resin and a catalyst-carrying conductor is applied or placed on an electrolyte membrane; and
    externally exposing the precursor of the membrane electrode assembly to a superheated medium selected from a superheated water vapor at a temperature from more than 100° C. to 280° C. at ambient pressure under oxygen-free or low-oxygen conditions and heating the boundary of the electrolyte membrane and the catalyst mixture in the precursor of the membrane electrode assembly by condensation heat of the superheated medium to fix the catalyst mixture to the electrolyte membrane without pressurization or with an application of a low pressure of 1 MPa or lower.

2. The method for producing a membrane electrode assembly according to claim 1, wherein the step of heating the boundary of the electrolyte membrane and the catalyst mixture in the precursor of the membrane electrode assembly to fix the catalyst mixture to the electrolyte membrane is carried out without pressurization.

3. The method for producing a membrane electrode assembly according to claim 1, wherein the step of heating the boundary of the electrolyte membrane and the catalyst mixture in the precursor of the membrane electrode assembly to fix the catalyst mixture to the electrolyte membrane is carried out with the use of a porous heating plate without applying any pressure or applying a low pressure of 1 MPa or lower, which is equivalent to the weight of the heating plate.

4. The method for producing a membrane electrode assembly according to claim 1, wherein the electrolyte membrane comprises a concave portion on which the catalyst mixture is applied or placed.

5. The method for producing a membrane electrode assembly according to claim 1, wherein the electrolyte resin is the type-F perfluoropolymer electrolyte and/or the type-F hydrocarbon polymer electrolyte, and the superheated medium is a superheated water vapor at a temperature from 200° C. to 280° C.

6. The method for producing a membrane electrode assembly according to claim 5, wherein the electrolyte resin is the type-F perfluoropolymer electrolyte and/or the type-F hydrocarbon polymer electrolyte, and further comprising a step of hydrolyzing a type-F functional group therein.

7. The method for producing a membrane electrode assembly according to claim 1, wherein the electrolyte resin is the type-H perfluoropolymer electrolyte and/or the type-H hydrocarbon polymer electrolyte and the superheated medium is a superheated water vapor at a temperature more than 100° C. to 150° C.

8. The method for producing a membrane electrode assembly according to claim 1, wherein the electrolyte membrane comprises a reinforcing layer composed of a porous substrate.

9. A membrane electrode assembly produced by the method according to claim 1, wherein the portion at which the electrolyte membrane is integrated with the electrode layer is free of boundary and the electrode layer in the vicinity of the portion is porous.

10. A polymer electrolyte fuel cell comprising the membrane electrode assembly according to claim 9.

* * * * *